United States Patent
Chenevert

[15] 3,688,851
[45] Sept. 5, 1972

[54] TREATING SUBSURFACE FORMATIONS
[72] Inventor: Martin E. Chenevert, Houston, Tex. 77027
[73] Esso Production Research Company
[22] Filed: March 16, 1970
[21] Appl. No.: 19,574

Related U.S. Application Data

[63] Continuation-in-part of Ser. No. 726,693, May 6, 1968, abandoned, which is a continuation-in-part of Ser. Nos. 675,490, Oct. 16, 1967, abandoned, and Ser. No. 699,255, Jan. 19, 1968, abandoned.

[52] U.S. Cl. .................175/50, 175/65, 175/66, 252/8.5 P, 166/250
[51] Int. Cl. ...........................................E21b 21/04
[58] Field of Search.....252/8.5 M, 8.5 P; 175/40, 50, 175/65, 66, 72; 166/250, 275

[56] References Cited

UNITED STATES PATENTS

| | | | |
|---|---|---|---|
| 2,552,775 | 5/1951 | Fischer et al. | 252/8.5 P |
| 2,689,219 | 9/1954 | Menaul | 252/8.5 P |
| 2,702,787 | 2/1955 | Freeland | 252/8.5 P |
| 2,953,525 | 9/1960 | Young | 252/8.5 P |
| 2,994,660 | 8/1961 | Reddie et al. | 252/8.5 P |

OTHER PUBLICATIONS

Moore, John E., How to Combat Swelling Clays, in Petroleum Engineer, Mar. 1960, pp. B– 78, 90, 94, 95, 96, 98– 101.

*Primary Examiner*—Stephen J. Novosad
*Attorney*—James A. Reilly, John B. Davidson, Lewis H. Eatherton, James E. Gilchrist, Robert L. Graham and James E. Reed

[57] ABSTRACT

Shaley earth formations are drilled or otherwise treated with reduced difficulty through the use of water-in-oil invert emulsion fluids wherein the aqueous phases of the emulsions possess particular water vapor pressures relative to the formations which they contact. The aqueous vapor pressure of an oil-base fluid containing dispersed water is controlled to prevent damage to water-sensitive shale formations by monitoring the vapor pressure of the aqueous phase of the fluid and maintaining a vapor pressure depressant in the aqueous phase in a concentration sufficient to substantially prevent the migration of water from the fluid to the formations. The aqueous vapor pressure of an earth formation is determined. A method and apparatus are disclosed for determining the compatibility of a well fluid with a water-sensitive subsurface formation wherein a substantially unaltered sample of the formation is immersed in the fluid and the direction and extent of water migration between the well fluid and the sample are logged. Improved water-in-oil invert emulsion fluid compositions for drilling and other oil field uses are obtained wherein the aqueous phases of the emulsions possess particular water vapor pressures relative to the formations which they contact.

35 Claims, 8 Drawing Figures

PATENTED SEP 5 1972

INVENTOR
MARTIN E. CHENEVERT

BY
James E. Gibhart

ATTORNEY

INVENTOR.
MARTIN E. CHENEVERT
BY
James E. Gilhooly
ATTORNEY

INVENTOR.
MARTIN E. CHENEVERT

FIG. 8

TREATING SUBSURFACE FORMATIONS

CROSS REFERENCES TO RELATED APPLICATIONS

This application is a continuation-in-part of application, Ser. No. 726,693, filed May 6, 1968, now abandoned, which was a continuation-in-part of application, Ser. No. 675,490, filed Oct. 16, 1967, now abandoned, and application, Ser. No. 699,255, filed Jan. 19, 1968, now abandoned.

BACKGROUND OF THE INVENTION

1. Field of the Invention

This invention is directed primarily to the drilling of wells through water-sensitive earth formations. More particularly, the invention is concerned with methods for formulating drilling fluids, methods for drilling, and drilling fluid compositions which enable formations to be drilled with a minimum of difficulty. The invention also pertains, in general, to methods for designing and applying fluids which find use in contact with shaley earth formations, and fluid compositions for such use.

2. Description of the Prior Art

The problems encountered in drilling through shales and similar water-sensitive formations are of long standing in the petroleum industry. Such problems are particularly acute in deep formations containing hard shales but are also troublesome in shallower formations. The nature and extent of the difficulties encountered generally depend in part upon the characteristics of the particular water-sensitive formations to be penetrated. Geologically speaking, such formations normally contain fine-grained argillaceous materials which in a compressed state have very low permeabilities, generally less than 0.001 millidarcy. Since such materials may have been deposited under widely different circumstances and subsequently subjected to different temperature and pressure conditions, water-sensitive formations may have mineral compositions and water contents which vary considerably.

Water-sensitive shales are broadly categorized in the petroleum industry as either "soft" shales or "hard" shales. Soft shales are generally considered to include the plastic, gumbo, wet, hydratable, and swelling shales which "dissolve" or disperse readily in water. Soft shales usually occur in young stratigraphic sequences and in the shallower formations within any stratigraphic sequence. "Hard" shales, on the other hand, are hard and are substantially insoluble and nondispersible in aqueous media. They generally contain much less water and montmorillonite than do soft shales. Hard shales generally occur in older, deeper formations.

Soft shales and hard shales both present serious problems during drilling operations. If soft shales are drilled with water or water-base fluids, for example, they may readily disperse or dissolve in the circulating fluid to form a troublesome plastic mass. This dispersion has been generally attributed to the presence of montmorillonite in the shales. Hard shales, on the other hand, do not normally disperse in the fluid but nevertheless quickly lose their strength and break and slough. Until recently there has been no satisfactory or accepted explanation for the failure of hard shales. The extremely low permeabilities of these shales have led observers to theorize that drilling fluids can penetrate only along the bedding planes and that the failures which occur are due to such penetration. It has also been generally assumed that hard shales are non-swelling in the presence of water.

Difficulties in drilling through gumbo and other soft shales have been alleviated to some extent in the past by the use of water-in-oil invert emulsion muds and other oil-base fluids. The use of invert emulsion muds prepared with saturated sodium chloride solutions or containing moderate amounts of calcium chloride, normally less than 250,000 parts per million, in the water phase of the emulsions has also provided some improvement. The results obtained with such fluids, however, have generally been inconsistent and unpredictable.

Oil-base muds, including water-in-oil invert emulsion muds, have also been used for drilling hard shales. In most instances such use has provided little, if any, improvement over the use of water-base muds. Serious mud losses, formation damage, and increased operating expenses have often been incurred. Although increasing the weight of the drilling fluid and drilling more slowly has often helped, efforts to overcome difficulties encountered with hard shales have in the past been largely unsuccessful.

SUMMARY OF THE INVENTION

This invention provides means for alleviating problems normally encountered when shales and similar water-sensitive argillaceous earth formations are contacted with aqueous fluids. The invention greatly extends the application of oil-base drilling fluids for drilling water-sensitive formations and is especially useful in drilling or treating hard shale formations such as the Midway and Dexter shales in East Texas and West Louisiana, the Wolfcamp shale in West Texas, the Springer and Atoka shales in Oklahoma, and similar hard shales elsewhere.

In accordance with the invention, it has now been found that shales, shaley sands, and similar argillaceous formations, in spite of their extremely low permeability, possess a strong attraction for water and are capable of withdrawing water from water-in-oil emulsions and other fluids with which they come in contact. This sensitivity to water is evidenced by dimensional changes in response to the absorption or desorption of water. These changes, although sometimes very slight, contribute materially to formation failure. It has been found that the rate at which such a formation withdraws water from a particular aqueous fluid is a quantitive measure of the degree of water sensitivity of the formation in the presence of that fluid. This rate and hence the water sensitivity of the formation can be assessed by at least partially immersing a substantially unaltered sample of the formation in the fluid and measuring the changes in dimensions, weight, or other properties of the sample, directly or indirectly, over a selected period. A preferred method of measuring the water sensitivity of the formation is to measure the deformation rate, whether visible or subvisible, of a formation sample in the presence of the fluid.

Although the mechanisms responsible for the transfer of water between the emulsion fluid and the argillaceous shale with which the emulsion fluid comes in contact are evidently complex and are not fully understood, experience has shown that water transfer from the emulsion fluid to the shale will normally occur if the vapor pressure of the aqueous phase of the fluid is greater than the vapor pressure of the formation. Measurement of vapor pressures thus provides a convenient technique for the evaluation of emulsion fluids. Aqueous vapor pressure is directly proportional to the activity of water and hence water transfer will normally occur from emulsion to shale when the activity of the water contained within the aqueous phase of the emulsion exceeds that of water contained within the shale. It is important to note that the aqueous vapor pressure of the formation normally differs from the vapor pressure of the water or brine contained within the formation. It appears that certain electrical or absorptive forces associated with the matrix or composition of the formation itself greatly decrease the vapor pressure which the water contained therein would otherwise be expected to have. Measurement of the aqueous vapor pressure of the formation, which characterizes the activity of the formation water, is therefore an important aspect of the invention.

Two general methods for designing oil-base drilling fluids in accordance with the invention are disclosed. Both involve the addition of vapor pressure depressants to the aqueous phase of the emulsion fluid in amounts sufficient to eliminate or to retard transfer of water from the drilling fluid to the argillaceous formation. The first method is a direct simulation of the interaction of the fluid and the water-sensitive formation. A water vapor pressure depressant is preferable first dissolved in the aqueous phase of the emulsion drilling fluid. The rate of water transfer between this fluid and the formation is then quantitatively determined by immersing a sample of the formation in substantially its natural state in the fluid and determining the rate of deformation. The concentration of the water vapor depressant can then be increased and additional samples tested until a concentration that reduces the rate of deformation to substantially zero is found. A deformation rate that for all practical purposes approaches zero indicates that the fluid can be used with little likelihood of damaging the formation.

A second method for designing drilling fluids requires that the aqueous vapor pressure of the argillaceous shale formation first be determined. This can be done by exposing formation samples to atmospheres above different saturated salt solutions having known water vapor pressures until equilibrium is reached. By observing the weight change of the sample resulting from water migration, the vapor pressure of an atmosphere that would result in no weight change is determined. This value represents the formation vapor pressure. After thus determining the vapor pressure of the shale formation, an emulsion fluid having an aqueous vapor pressure substantially equal to that of the formation can be prepared. Such a fluid can be used to drill the water-sensitive formation with little likelihood of the hole sloughing.

It is still a further aspect of the invention to provide a method and apparatus to monitor invert emulsion drilling fluids at the well site during drilling operations so that the fluid composition can be changed to compensate for drilling fluid contaminants and the like encountered in the borehole. Another aspect of the invention is to provide improved water-in-oil emulsion drilling fluid compositions. While oil-base fluids and invert emulsion fluids, which are both water-in-oil emulsion fluids, are sometimes distinguished on the basis of water content, all three terms are treated as synonymous herein. It is still another aspect of the invention to provide methods for designing improved coring fluids, treating fluids, fracturing fluids, displacement fluids, and the like which contact water-sensitive formations.

DESCRIPTION OF THE PREFERRED EMBODIMENTS

I. Design of Drilling Fluids
 A. The Simulation Test Method
  1. Nature of the Simulation Test Method The simulation test is based on the discovery that the rate at which shales and other argillaceous formations absorb water from a particular aqueous fluid is a quantitative measure of the degree of water sensitivity of the formation in the presence of the fluid. The test is performed by at least partially immersing a sample of the formation which is in substantially its natural state of hydration in the drilling fluid of interest and determining the rate of water absorption.

One method for determining the water absorbed is bychange of weight of the sample. The sample is weighed initially and its change in weight observed over a period of time. Any change in weight which occurs is attributable to the migration of water. Weight measurements can be obtained while the sample is immersed by suspending it in the drilling fluid and periodically recording the suspended weight. In lieu of this, the sample may be withdrawn from the fluid after a fixed period of time, cleaned, and then weighed. Another method recognizes that the resistivity of the sample will decrease as it absorbs water and utilizes changes in resistivity to measure the amount of water absorbed. Still other methods are based on the measurement of changes in sonic velocity, compressive strength, and other physical properties which vary with water content to indicate the rate of absorption.

The preferred method of measuring absorption is to log the rate of change in dimensions of a shale sample while it is immersed in the drilling fluid. This gives a direct measurement of the deformation of the shale due to the drilling fluid and thus provides a quantitative measurement of the rate of water absorption. A wide variety of devices for recording changes in dimensions may be used, including micrometers, optical equipment, dial displacement indicators, and the like. The preferred apparatus, however, is a displacement transducer instrumented with strain gauges.

2. The Displacement Transducer Apparatus

Figure 1:
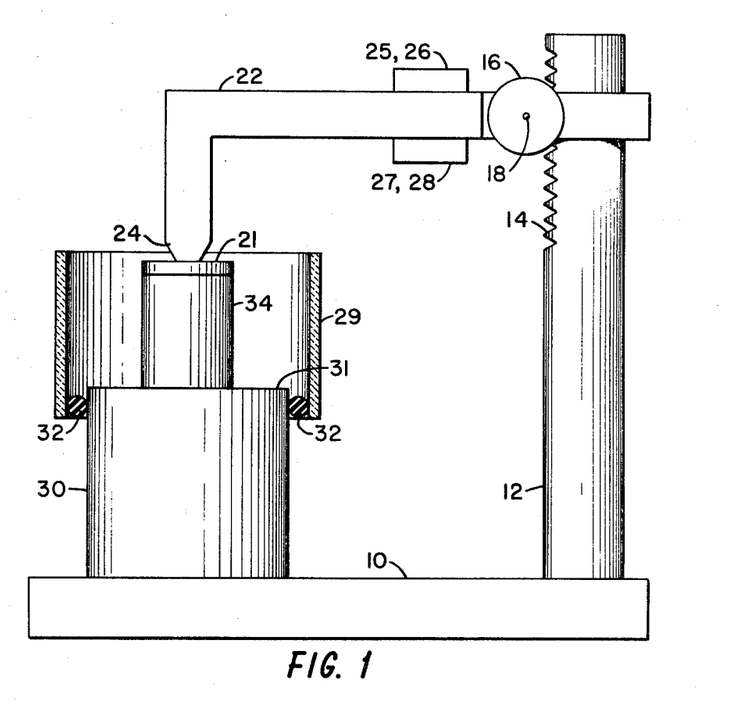
FIG. 1 schematically depicts an elevation view of a displacement transducer instrumented with strain gauges suitable for performing the simulation test method of the invention.
Figure 2:
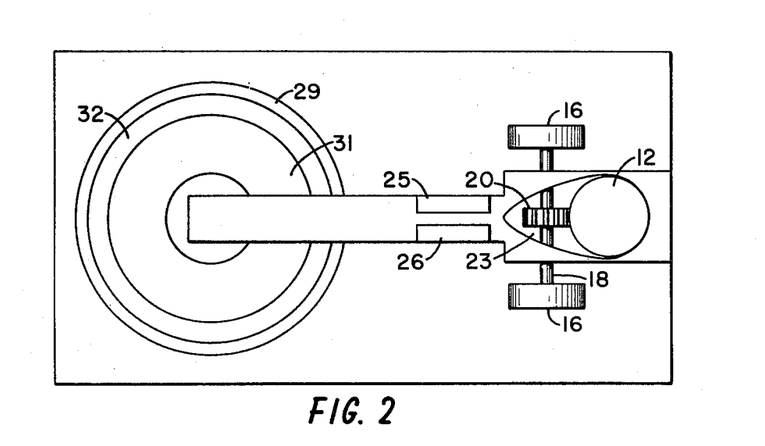
FIG. 2 is a schematic plan view of the apparatus of FIG. 1.

FIGS. 1 and 2 illustrate a resistance strain gauge displacement transducer suitable for measuring the change in dimensions of a sample of shale or similar material. This apparatus includes a rectangular base 10 from which a substantially cylindrical column 12 extends vertically. A series of beveled teeth on the upper portion of column 12 form rack 14.

Cantilever deflection beam 22 engages rack 14. The outermost end of the deflection beam extends downwardly in an L-shape terminating in a frusto-conical end terminus 24. Contactor shoe 21 is mounted on end terminus 24. The innermost end of the deflection beam 22 contains a generally oval aperture 23, one end of which forms a yoke that fits over upright column 12 and forms a slidable support with the column. Shaft 18 passes through deflection beam 22 at the other end of aperture 23. Knobs 16 are mounted on the ends of shaft 18. Pinion 20 is supported on the shaft 18 in a position corresponding to the middle of the aperture to cooperate with rack 14. Upper strain gauges 25 and 26 are mounted on the upper side of deflection beam 22. Lower strain gauges 27 and 28 are positioned on the other side of the beam.

A cylindrical pedestal 30 extends from a rectangular base 10 underneath contactor shoe 21. The upper surface 31 of the cylindrical pedestal is smooth and forms a bearing surface underneath shale sample 34. Cylindrical cup 29 slides upon cylindrical pedestal 30. Sealing member 32 is mounted between the cup and the pedestal to prevent the leakage of fluids.

Figure 3:
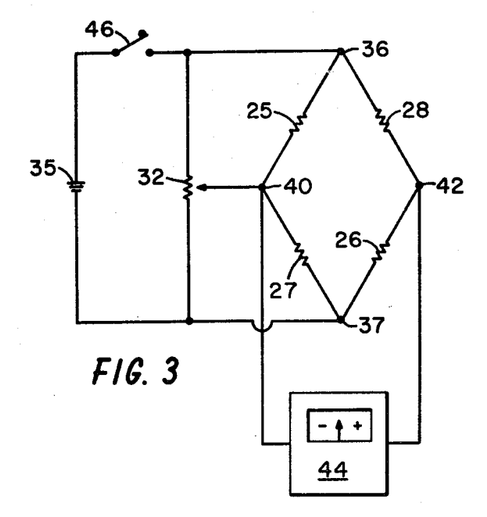
FIG. 3 is a schematic diagram of an electrical circuit that can be used with the apparatus of FIG. 1.

FIG. 3 illustrates an electrical circuit suitable for use with the strain gauge displacement transducer apparatus. A four-resistor electrical bridge in which strain gauges 25, 26, 27, and 28 form the resistors is shown. At least four resistors are generally used to obtain increased amplitude and inherent temperature compensation. Variable resistor 32 is placed in the circuit to balance the bridge prior to strain measurements. Voltage source 35 creates a difference in potential across resistor 32 and across the bridge between contacts 36 and 37, causing direct current to flow through resistor 32 and the legs of the bridge formed by resistors 25 and 27, and 26 and 28, respectively. Voltage is measured between terminals 40 and 42 by voltmeter 44. In lieu of this, a suitable strain indicator, such as Model P–350 sold by The Budd Company, Phoenixville, Pennsylvania, could be used. Switch 46 is used to turn the strain gauge transducer on and off. Although the relatively simple strain gauge circuit illustrated is suitable, other circuits such as those illustrated in M. Hetenyi's book, *Handbook of Experimental Stress Analysis*, John Wiley & Sons, Inc., New York, New York (1950) could readily be adopted.

Prior to using the strain gauge transducer, it must be calibrated to determine the relationship between observed voltages and displacement. This can be done by first zeroing the voltmeter, as is discussed below, and then placing successively larger or smaller articles of known length between contactor shoe 21 and cylindrical pedestal 30 and observing the voltages. From these data a constant that relates voltage and displacement can be obtained.

To use this equipment to analyze the compatibility of a drilling fluid and a particular shale, a sample of the shale should be placed on surface 31 of cylindrical pedestal 30. Deflection beam 22 is then lowered by turning knob 16. This rotates shaft 18 on which pinion 20 is mounted. Pinion 20 cooperates with rack 14 to convert the rotational movement of the knob 16 into a downward translational movement of beam 22. The beam should be lowered until contactor shoe 21 engages the shale sample 34 and holds it firmly in place on surface 21 of the pedestal 30.

With the shale sample thus mounted, the strain gauge's electrical circuit should be balanced. Voltage source 35 is energized by closing switch 46, causing current to flow through variable resistor 32 and both sides of the resistance bridge. The bridge is balanced by adjusting variable resistor 32 until voltmeter 44 is zeroed. Once the bridge has been balanced, the voltage readings will indicate deformation. Cylindrical cup 29 is then raised to its uppermost position so that the upper edges of the cup are above the top of sample 34. Sufficient drilling fluid to cover the sample is then poured into the cup held between contactor shoe 21 and surface 31 of cylindrical pedestal 30.

Once the drilling fluid contacts the sample mounted within the strain gauges, the sample will begin to absorb water and expand if it is incompatible with the fluid. Expansion of the sample will force contactor shoe 21 upward, deflecting beam 22. Deflection of the beam results in deformation of the strain gauges and produces an imbalance in voltage readings across the bridge. If the fluid absorbs water from the sample, the sample will generally exhibit shrinkage. Such shrinkage also normally produces an imbalance in voltage readings across the bridge. However, these voltages will have an opposite sign from those caused by swelling.

Several voltage readings should be taken at various times after the sample has been immersed in the drilling fluid. The voltage readings are proportional to the displacement of the sample between contactor shoe 21 and pedestal 30. The relationship between displacement and time can be determined from the calibration constant and used to determine the rate at which this sample will absorb water from the particular drilling fluid. When comparing data, it is useful to normalize the displacement data by dividing each reading by the sample length. The normalized data is then referred to as "strain." The rate so determined is indicative of the degree of compatibility between the water-sensitive formation and the drilling fluid.

3. Selection and Preparation of Formation Samples

The determination of the water sensitivity of a subsurface formation in the presence of a particular drilling fluid in accordance with the invention is normally carried out with a sample of the formation having substantially its in situ composition. Exposure to high temperatures and other treatment that may alter the composition should be avoided. It is preferred that this sample be in substantially its natural state of hydration so that its surface absorption behavior will approximate in situ absorption behavior. Laboratory tests performed at reservoir conditions of temperature and pressure, when compared with absorption tests conducted under atmospheric conditions, indicate that atmospheric tests are sufficiently accurate for most practical purposes.

The formation samples utilized may be preserved core samples from the subject well or from a nearby well that penetrates the same formation. Such preserved samples are particularly representative when the coring fluid used inhibits absorption of water by the water-sensitive formation. Fragments of the formation entrained by the drilling fluid and carried to the surface can also be used. Since a water-sensitive formation will begin hydration as soon as it is contacted with a water-containing drilling fluid, it is preferable that such fragments be recovered as early as possible after initial contact of the rock by the fluid. Hence, the depth of the formation of interest should be estimated and samples from the earliest returns from drilling the formation should be secured for the test. The use of an oil-base drilling fluid treated in accordance with the invention generally simplifies the recovery of samples in substantially their natural state of hydration.

Where severe hydration of the formation has occurred, the samples obtained should be restored to their natural state of hydration. Hydration is not always encountered when the drilling fluid is a treated oil-base fluid and is generally more severe where a water-base fluid is used to drill a highly water-sensitive shale. Restoration to a substantially natural state can be accomplished by baking the samples at a temperature slightly above 100° C until sample density corresponds with typical shale density for this formation and depth of burial. Sample density can be rapidly determined by means of a graduated density liquid column, the mercury pump pressure chamber method, or other suitable techniques. Correlations of shale density versus depth of burial are available in the literature for various formations and are typified by those published by K. F. Dallmus in his study "Mechanics of Basin Evolution and Its Relation to the Habitat of Oil in the Basin," *Habitat of Oil - A Symposium*, Tulsa, Amer. Assoc. Petrol. Geol., 1958, p. 883–931. It is important that temperature not greatly exceed 100° C since excessive temperatures may result in substantial changes in characteristics of the sample.

4. Drilling Fluid Design

Use of the method and apparatus of the invention to formulate an oil-base drilling fluid that will prevent or minimize absorption and thus promote borehole stability is based in part on the observation that an oil-base or water-in-oil emulsion mud having an aqueous vapor pressure substantially equal to or less than that of the troublesome water-sensitive formation will prevent absorption of water by the formation. Samples of the water-sensitive formation in substantially their natural state should be used, as indicated above. Several of these samples are preferably immersed in a corresponding number of different oil-base drilling fluids having different aqueous vapor pressures and strain-time data are obtained for each fluid-formation combination. This procedure can be greatly expedited by using a number of strain gauge displacement transducers.

A series of water-in-oil emulsions or other oil-base muds having different aqueous vapor pressures can be prepared by adding various concentrations of inorganic salts such as NaCl or $CaCl_2$ to the mud. A number of other vapor pressure depressants are discussed herein in connection with the method of determining the vapor pressure of an earth formation. Suitable vapor pressure depressants are not limited to these or similar inorganic salts, however. Any solute introduced into the aqueous phase will reduce the aqueous vapor pressure.

Figure 4:
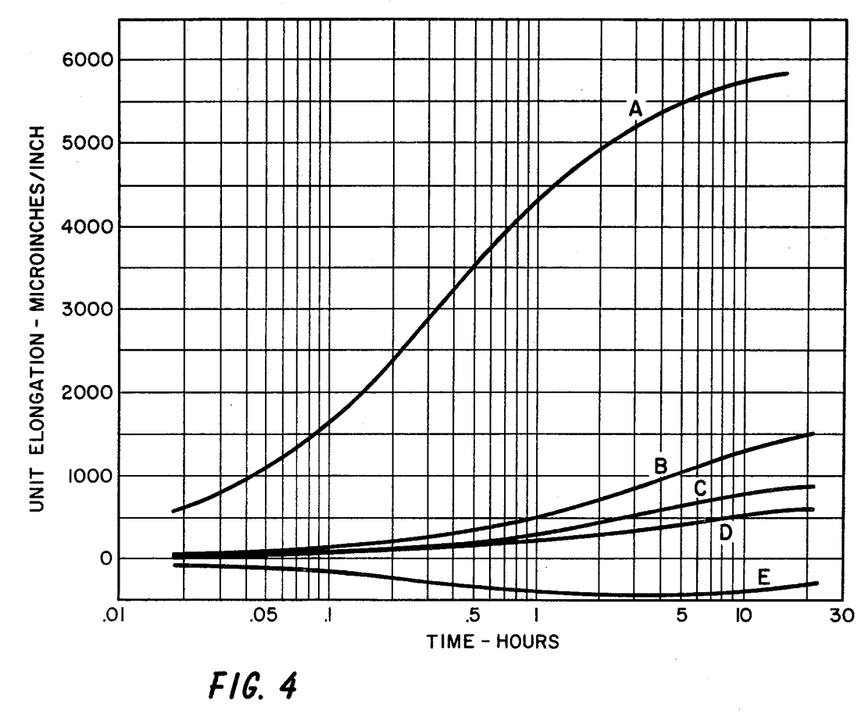
FIG. 4 graphically illustrates unit elongation versus log time data recorded while testing a hard shale in accordance with the simulation test method of the invention.

FIG. 4 illustrates strain-time data obtained in accordance with the invention for the hard, argillaceous Wolfcamp shale. Fluid A is water, and the high rate of absorption for this fluid is typical of a very compatible fluid. Fluids B, C, D, and E are water-in-oil invert emulsions containing in the aqueous phase, as vapor pressure depressants, 130,000-ppm NaCl, 200,000-ppm NaCl, 270,000-ppm NaCl, and 450,000-ppm $CaCl_2$, respectively. Curves B, C, and D illustrate the reduction in absorption that occurs as the concentration of the aqueous vapor pressure depressant is increased and the aqueous vapor pressure of the fluid approaches that of the formation. Curve E illustrates behavior characteristic of a water-in-oil emulsion mud with an aqueous vapor pressure that has been reduced below that of the water-sensitive formation. Instead of swelling, the shale sample shrinks, indicating that water is being desorbed from the shale sample. The use of a drilling fluid with a composition similar to that of mud E would therefore prevent absorption of water by the shale. Generally, however, there is little incentive in attempting to dehydrate a water-sensitive formation and therefore such a fluid would normally be considered to contain an excessive amount of vapor pressure depressant. In most cases it would be more economical to reduce the concentration of $CaCl_2$ in Fluid E so that its strain-log-time curve would more closely approach the zero strain line than to use a mud such as Fluid E.

Figure 5:
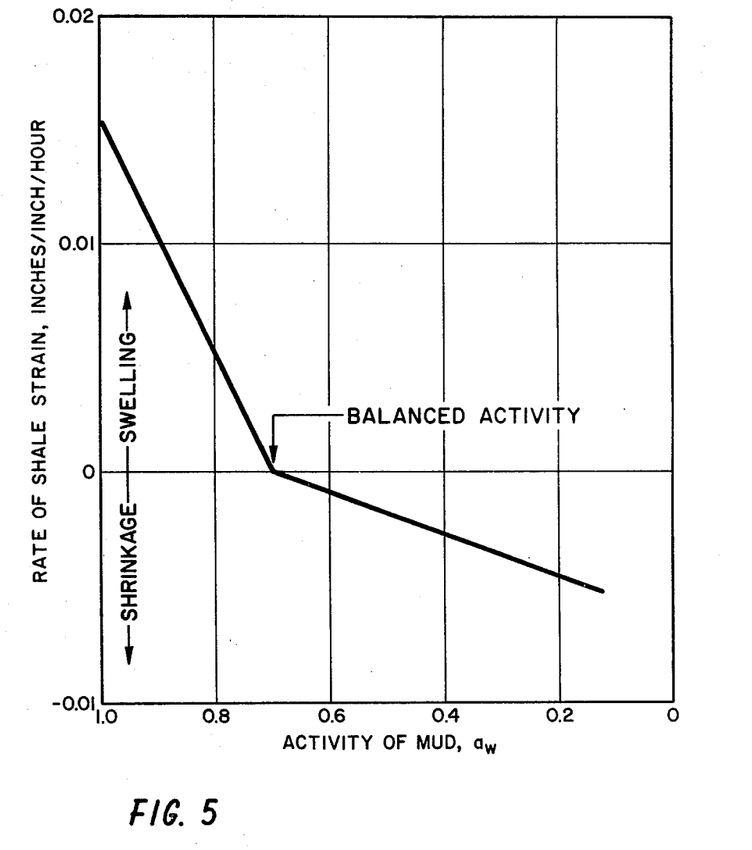
FIG. 5 graphically illustrates the rate of deformation exhibited by a number of samples of an argillaceous shale formation contacted by water-in-oil emulsion drilling fluids having different aqueous activities.

FIG. 5 illustrates graphically the rates of deformation of a series of shale samples exposed to invert muds having varying aqueous activities (relative vapor pressures). The shale formation on which the tests were run had an aqueous activity of 0.7. Each test involved immersing a shale sample in an invert mud having a known aqueous activity for a period of 10 hours, measuring the strain, and then computing the average rate of strain of the sample over this time period. It will be noted that shale samples exposed to muds having aqueous activities higher than 0.7 swelled and that the observed rate of swelling increased as the difference in aqueous activity between the mud and the sample increased. Samples contacted with muds having aqueous activities lower than 0.7 shrank. Again, however, the rate of deformation increased in relation to the activity difference. These data demonstrate that when a difference in activity exists, water will flow either from the emulsion mud to the shale or from the shale to the mud.

The former causes swelling of the water-sensitive subterranean formation, leading to its sloughing into the wellbore; the latter increases the water content and thus viscosity of the drilling fluid, necessitating frequent additions of oil, salt and other materials required to maintain the drilling fluid. However, when the activity of the mud is substantially equal to that of the shale formation being drilled, a unique relationship exists. So long as this balanced condition is maintained, there is substantially no migration of water in either direction. Thus, it is especially desirable to maintain the aqueous activity of the mud about equal to that of the shale and thereby both eliminate sloughing of the borehole and obviate the addition of salt, oil or other materials to the mud normally required when it is contaminated by water.

Although the simulation test has been discussed in relation to water-in-oil emulsion drilling fluids the utility of the simulation test is not limited to this type of drilling fluid. The simulation test method and apparatus can be used to determine the compatibility of any drilling fluid with a water-sensitive formation and can be employed to select the most compatible drilling fluid from any group of drilling fluids. The method and apparatus can also be used to determine whether or not a particular formation is water-sensitive and to select fluids for use in secondary recovery, well stimulation, or other well operations, as is more fully discussed subsequently herein.

B. The Formation Vapor Pressure Test Method

1. The Method of Determining the Vapor Pressure of an Earth Formation

The aqueous vapor pressure of a shale or other water-containing earth formation can be determined by subjecting a sample of the formation to air of a constant known humidity for a period of time sufficient for moisture within the shale to reach equilibrium with the moisture in the air. It will normally be difficult to preselect a humidity condition such that the natural water content of the shale will be in equilibrium with this condition of humidity. So, generally speaking, several different humidity conditions must be used to obtain a range of water contents within the sample which will span the in situ water content of the formation within the earth.

A very convenient procedure for exposing samples of a given formation to air of different humidities is to suspend or place the sample in a sealed container in an atmosphere of air above a saturated aqueous solution of a solute which contains an excess of undissolved solute. Thus, it is known that the relative humidity of the enclosed space above such a solution where the sample has been placed will remain substantially constant at a given temperature—conveniently room temperature (25° C). An article containing an explanation of this principle and also listing a number of saturated solutions and solutes is contained in *Ecology:* Vol. 41; No. 1; pp.232–237 (January, 1960). Typically, a series of several different saturated solutions can be prepared, and one or more samples of a given shale or other formation can be exposed to an enclosed atmosphere above each of these samples for a sufficient period of time for equilibrium to occur. Complete equilibrium will normally take about 1 or 2 weeks, but substantial equilibrium can normally be attained in about 1 or 2 days.

As noted above, a number of different saturated aqueous solutions should be selected such that a given formation sample is equilibrated at a range of relative humidities. The use of 8 to 10 different relative humidities ranging from about 10 percent relative humidity to 95 percent or more relative humidity has been found to be very desirable and effective. In this connection, it has been found to be quite effective to use the following saturated solutions to obtain a suitable range of atmospheres. The solutions and the relative humidities which exist above these solutions are listed below:

| Saturated solution of | Relative humidity (%) at 25°C |
|---|---|
| $ZnCl_2 \cdot 1\frac{1}{2} H_2O$ | 10.0 |
| $CaCl_2 \cdot 6H_2O$ | 29.5 |
| $Ca(NO_3)_2 \cdot 4H_2O$ | 50.5 |
| $NH_4Cl + KNO_3$ | 71.2 |
| $(NH_4)_2 SO_4$ | 80.0 |
| Na Tartrate | 92.0 |
| $KH_2PO_4$ | 96.0 |
| $K_2Cr_2O_7$ | 98.0 |

Many of these salts, incidentally, may themselves be used within the aqueous phase of invert emulsions for the purpose of establishing the vapor pressure of that phase. If vapor pressures less than that obtainable for a saturated calcium chloride solution are desired, solutions of $ZnCl_2 \cdot 1\frac{1}{2} H_2O$; $LiCl \cdot H_2O$; $ZnBr_2$; $LiBr \cdot 2H_2O$; potassium hydroxide or other stronger vapor pressure depressant may be employed. The depressant, of course, must be compatible with the invert emulsion of interest; and such compatibility should be tested prior to actual use.

After a formation sample has reached equilibrium with a particular atmosphere of known relative humidity, the sample should be withdrawn from the atmosphere and its water content promptly determined. A simple procedure for determining its water content is to weigh the equilibrated sample, and then repeat the weighing after the sample has been dried at about 105° C for a period of 12 to 24 hours. The loss in weight of the sample is a direct measure of the equilibrated water content of the sample. The vapor pressure of the sample for this water content is the vapor pressure of water at room temperature (or the temperature of the equilibrium condition) multiplied by the percent relative humidity of the air in equilibrium with the sample.

Figure 6:
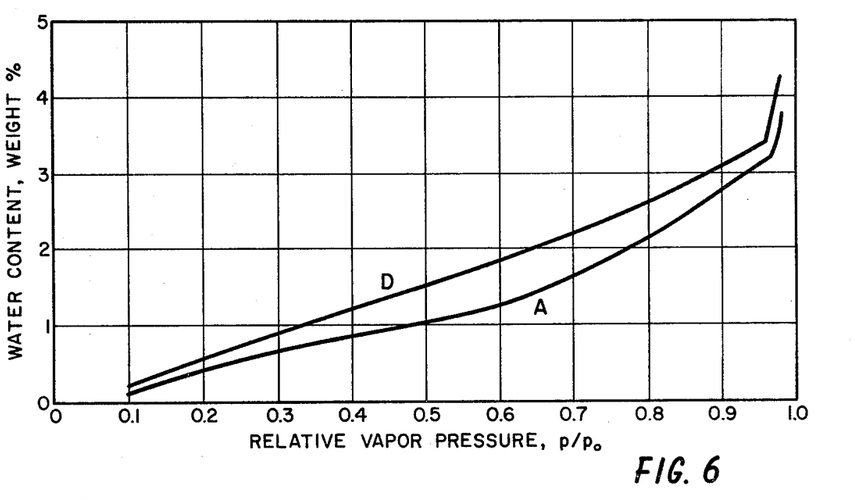
FIG. 6 shows the water vapor pressure (P), relative to the vapor pressure of pure water ($P_o$), exhibited by a West Texas hard shale at 25° C for various water contents within the shale.

After the vapor pressures and water contents of a given sample or set of samples have been determined, these values can be recorded on a suitable chart or other record medium and intermediate values can be determined from the resulting correlation. Thus, FIG. 6 of the drawing shows two correlations (A for absorption conditions, and D for desorption conditions) obtained by subjecting samples of a West Texas hard shale to eight different conditions of relative humidity ranging from 10 percent relative humidity to 98 percent relative humidity at a temperature of 25° C. These curves also apply for temperatures at least as high as 100° C. As can be seen, slightly different correlations were obtained for tests in which water was desorbed from the shale samples as compared with tests in which water was absorbed by the shale samples. The shale sample in this instance had an in situ water content of 2.22 weight percent as determined by analyzing a small central portion of a core cut directly from the formation under conditions such that the water content of most of the core was undisturbed. From FIG. 6, it is apparent that this formation has a water vapor pressure (or "formation vapor pressure") relative to the vapor pressure of pure water of between about 0.71 and 0.81.

Another convenient method for determining the aqueous vapor pressure of a water-sensitive formation is to place a sample that is representative of the subsurface formation in a sealed container until it reaches equilibrium with the enclosed atmosphere. A direct measurement of the relative humidity of the formation sample can then be made. This method is also useful for determining the aqueous vapor pressure of a water-containing oil-base drilling fluid. Apparatus for measuring relative humidity is widely available. Typical of such apparatus is the Catalog No. 2200 ELECTRO-HYGROMETER that is sold by Lab-Line Instrument, Inc., Melrose Park, Ill.

2. Selection and Preparation of Samples

As indicated earlier, the use of this invention in designing well fluids should be preceded by a determination of the vapor pressure characteristics of the portions of the zones or formations which the emulsion fluid will contact. In the case of a drilling operation, as pointed out earlier in the discussion of the simulation test, a sample of the formation of interest should be obtained so that its vapor pressure can be determined. If a sample of the formation is not obtainable directly from the well being drilled, then an effort should be made to obtain a sample from a nearby well. It is also possible, however, to collect and use cuttings from the well which is being drilled.

Figure 7:
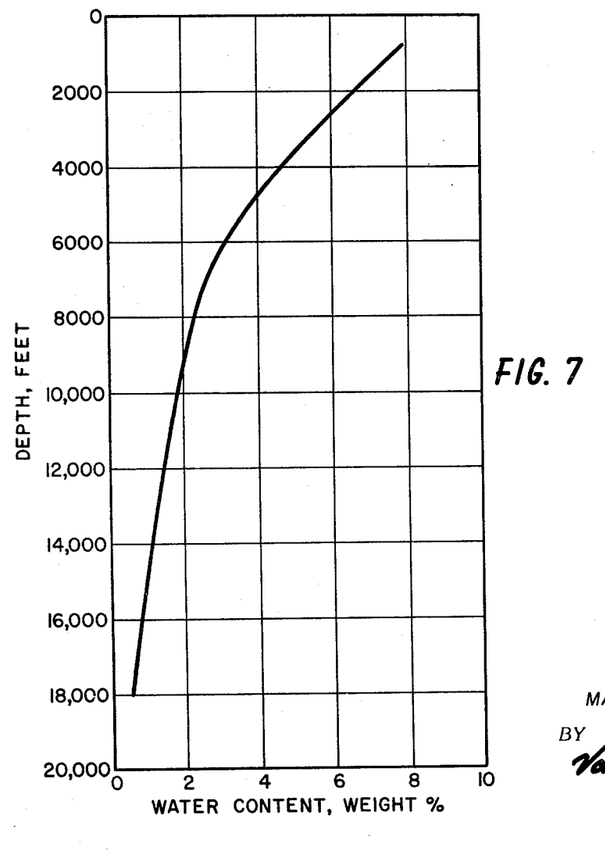
FIG. 7 is a correlation showing the average variation in the water content of a shale in terms of depth of burial within the earth.

Again, the preferred type of formation sample to obtain and study is a sample from the central portion of a core which has been cut from the formation under conditions suitable to preserve the natural conditions of the core as much as possible. If such a sample is available, a reasonably accurate determination can be made of the amount of in situ water contained in the core. If such a core cannot be obtained, the formation's water content can be estimated from FIG. 7. FIG. 7 is a correlation showing how the water content of many shaley formations within the earth vary, on the average, with increasing depth of burial. Thus, if a given formation lies about 10,000 feet beneath the surface, it may be expected to have, on the average, a water content of about 2 weight percent. It is then possible to use this water content, in combination with the method described earlier for determining the vapor pressure of a formation within the earth, to arrive at an approximate value of the vapor pressure possessed by the formation in its natural condition within the earth.

3. Drilling Fluid Design

Once the formation vapor pressure is known, it is then possible to select and formulate a water-in-oil drilling fluid having an aqueous phase vapor pressure which bears a particular relation to the aqueous vapor pressure of the formation. Generally speaking, it is desirable that the aqueous phase of the drilling fluid have an aqueous vapor pressure no greater than that of the water-sensitive formation. This frequently requires the aqueous vapor pressure of the drilling fluid to be less than that of a saturated sodium chloride solution and often it is desirable to saturate the aqueous phase of the drilling fluid with calcium chloride. As pointed out above with respect to drilling fluid design by the simulation method, it is especially desirable to maintain the aqueous activity of the mud at a level about equal to that of the water-sensitive formation. Balancing the activities in this fashion eliminates any substantial migration of water between the emulsion fluid and the formation, thereby eliminating any sloughing of the borehole as well as contamination of the mud by water contained within the shale.

However, economics or other considerations may occasionally make it undesirable to attempt to completely reduce the aqueous vapor pressure of the drilling fluid to that of the formation. As long as the water transfer between the fluid and formation is insufficient to cause excessive formation failure during the time period the water-sensitive formation is exposed to the wellbore, the aqueous vapor pressure of the drilling fluid can be considered to be substantially equal to that of the water-sensitive formation. However, it is preferable to reduce drilling fluid vapor pressure to a level that is equal to or below that of the formation.

Figure 8:
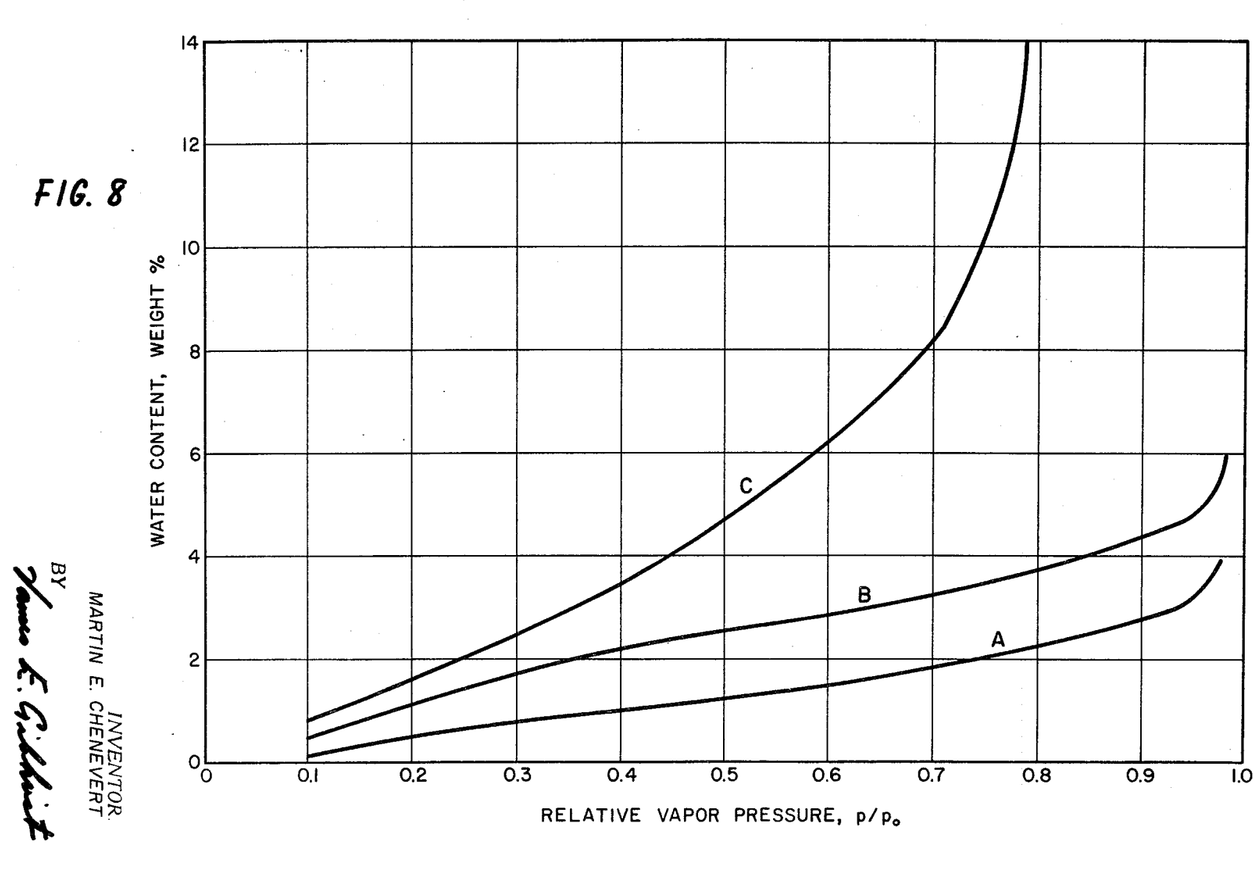
FIG. 8 is a correlation showing the average vapor pressure (P) of two hard shales and one soft shale relative to the vapor pressure of pure water ($P_o$) at 25° C for different shale water contents.

It should be noted that mixtures of salts can be used in the water phase of an invert, but such mixtures are subject to the common-ion effect. Their aqueous solutions may thus have higher aqueous vapor pressures than would otherwise be suggested by the total salt concentration. It should also be noted that the emulsifier and other water-soluble constituents of the drilling fluid may tend to slightly alter the vapor pressure of the aqueous solution containing the vapor pressure depressants when the emulsion fluid is prepared. Thus the aqueous vapor pressure of the emulsion fluid, which is the aqueous vapor pressure of the water phase of the emulsion fluid, may differ slightly from that of the aqueous salt solution used to prepare the emulsion. Generally speaking, however, an invert emulsion drilling fluid wherein the aqueous phase is saturated with sodium chloride may be used where the vapor pressure of the formation has a value (P) about three-fourths of the vapor pressure of water ($P_o$) at the same temperature (i.e., a relative vapor pressure of 0.75). Referring to FIG. 8, such a mud would be successful in drilling the deep, hard, West Texas shale (A) shown there which possesses a natural water content of about 2.2 weight percent. In that regard, it should be noted that hard argillaceous shales seldom exhibit relative aqueous vapor pressures in excess of 0.75. The deep, hard, Louisiana shale (B), for example, would normally be drilled with an invert emulsion fluid wherein the aqueous phase consists of saturated calcium chloride solution (i.e., a relative vapor pressure of 0.30). This shale has a connate or natural water content of about 1.8 or 1.9 weight percent. The soft, gumbo shale (C) has a connate or natural water content of about 11 weight percent and is best satisfied by a fluid with an aqueous phase vapor pressure less than a saturated aqueous NaCl solution.

C. Emulsion Drilling Fluids Designed by the Methods of the Invention

Referring specifically to water-in-oil invert emulsion drilling fluids, a variety of such fluids are commercially available for use in drilling wells. Fluids of this type may be modified by the addition of vapor pressure depressants and can be used for drilling through water-sensitive formations difficult to drill with the commercial fluids. Typical invert emulsion drilling fluids contain droplets of water finely dispersed or emulsified in an oil base. Diesel fuels, kerosenes, and high-gravity crude oils are frequently used as the oil base; and about 10 to 70 percent of fresh or common salt water is emulsified therein with the help of suitable emulsifying and stabilizing agents. Anionic, nonionic, and mixed anionic-nonionic emulsifiers are all used for this purpose. The emulsifiers and stabilizing agents employed in the fluids should be compatible with sodium chloride, calcium chloride, or whatever water vapor pressure depressant is to be incorporated in the aqueous phase of the modified compositions. One specific invert emulsion drilling fluid composition which has been tested and appears satisfactory for many applications comprises 70 volume percent No. 2 diesel fuel; 25 volume percent water saturated with calcium chloride; and 5 volume percent sorbitan mono-oleate as the emulsifier. No difficulty, however, has been encountered in obtaining other satisfactory compositions simply by adding sodium chloride or calcium chloride to certain existing commercially available invert emulsion drilling fluids. Where formations are particularly water-sensitive it may be desirable to prepare a drilling fluid having a vapor pressure which is less than that of a mud containing a saturated calcium chloride solution. Solutions containing $ZnBr_2$, $ZnCl_2$, $LiBr$, $LiCl$, or similar water-soluble salts can be employed for this purpose. In addition, it has been found that a supersaturated $CaCl_2$ mud can be formed by adding additional $CaCl_2$ to a mud having a saturated $CaCl_2$ solution as the aqueous phase. Such supersaturated $CaCl_2$ muds have vapor pressures lower than those of saturated $CaCl_2$ muds. Other water vapor depressants contemplated to be useful in the various embodiments of this invention include still other water-soluble salts; phosphoric acid, acetic acid, and other water-soluble acids; glycerol; sodium hydroxide; potassium hydroxide; etc.

D. Monitoring the Drilling Fluid at the Wellsite

Once a compatible drilling fluid has been selected and introduced into the drilling system, it is advisable to monitor the fluid periodically to insure retention of compatibility. Contaminants, absorption, and other phenomena may cause gradual changes in the composition of the mud. Monitoring can be rapidly accomplished by periodically immersing samples of successive formations penetrated by the well in portions of the mud in contact with these formations and logging the direction and extent of water migration between each such sample and the mud in which it is immersed with the displacement transducer apparatus.

In some cases it may be desirable to monitor the mud with calibrated shale samples having known vapor pressures. These calibrated samples may be preserved samples of the formation being drilled that have been taken from another well. Synthetic shale specimens, clay specimens, and the like, prepared so that they have particular aqueous vapor pressures can also be used. Calibrated shale samples representative of the water-sensitive formation are equivalent to substantially unaltered formation samples and the necessity for obtaining such samples from the well being drilled can thus be eliminated. By comparing an oil-base fluid of unknown aqueous vapor pressure with shale samples having known aqueous vapor pressures, it is apparent that the vapor pressure of the fluid can be determined. In this connection, it may be desireable to continuously monitor the aqueous vapor pressure of the oil-base mud with the displacement transducer and compare it with the formation vapor pressure. Another convenient method to monitor the aqueous vapor pressure of the mud is to place a sample in a closed container and directly measure the relative humidity of the atmosphere in contact with the samples as is discussed above.

The condition and composition of the oil-base fluid can be determined by periodically emulsion-breaking a mud sample and determining its water content. In addition, the water can be analyzed for its content of vapor pressure depressant. Thus, if the vapor pressure of the aqueous phase is being controlled by the presence of calcium chloride, the aqueous phase can be analyzed for this salt.

The condition of the drilling fluid can also be qualitatively evaluated by observing the cuttings produced in the drilling operation if the water-sensitive formation is such that it will undergo visible deformation as it absorbs water. If the cuttings are firm and uniform, it can therefore be inferred that the fluid and the formation are in satisfactory condition. On the other hand, if the cuttings become softer or more diffuse, the concentration of the vapor pressure depressant in the aqueous phase of the fluid should be increased.

If an invert emulsion drilling fluid prepared in accordance with the invention loses water from its aqueous phase during drilling, it is probable that the water is being absorbed by the surrounding formation; and if this is the case, drilling conditions will tend to become more adverse. It is therefore desirable, under such circumstances, to add vapor pressure depressant to the aqueous phase of the fluid until its aqueous vapor pressure is no greater than the aqueous vapor pressure of the formation being drilled. This can generally be done by vigorously mixing the fluid at the surface of the earth with fresh depressant.

As noted previously, drilling fluids prepared in accordance with the present invention are especially applicable for use in the drilling of hard shales. Until the advent of this invention, there has been no satisfactory procedure for dealing with such shales. As noted previously, such hard shales generally have aqueous activities less than 0.75 which corresponds to a saturated solution of NaCl. The results obtained in accordance with the invention have shown that invert emulsion muds wherein the aqueous phase is water saturated with calcium chloride are remarkably effective for a wide variety of such shales. If, during the course of drilling such a shale, additional calcium chloride must be added to the mud system, this may be done by mixing powdered calcium chloride into the fluid. Powdered calcium chloride has been found to readily enter the aqueous phase of an invert emulsion drilling fluid.

Abnormal pressure zones represent serious drilling hazards in many areas where wells are drilled. One characteristic of such zones is a transition zone that lies just above the abnormal pressure zone and that exhibits a marked increase in water content. Since a corresponding increase may also be observed in the water activity of shales in the transition zone, continuously logging the activity of formations penetrated provides a method of detecting abnormal pressure zones. Water activity of a shale is reflected by the ratio of its aqueous vapor pressure to the vapor pressure of pure water at the same temperature, i.e., relative humidity. It may therefore be desirable to log the aqueous vapor pressure of the drilling cuttings of the formations as they are penetrated. Measurements can be performed by exposing the cuttings to atmospheres of varying known humidities as discussed above, by placing the cuttings in a closed container and directly measuring the relative humidity of the atmosphere in contact with them as also discussed above, or by using the displacement transducer apparatus in conjunction with a series of oil-base fluids having known aqueous vapor pressures. If the aqueous vapor pressure of the shale is equal to that of the oil-base fluid, when the shale sample is placed in contact with the fluid it will exhibit no deformation.

II. Used of the Methods of the Invention for Other Fluids

A. Treating Fluids

The principles of this invention are also applicable to otherwise conventional well fluid compositions such as packer fluids, coring fluids, completion fluids, and well treating fluids. With respect to treating fluids, for example, the methods and apparatus of the invention are useful in designing fluids for repairing and restoring water-damaged formations. In the past, it has been conventional practice in the field to attempt to restore water-damaged formations by treating them with concentrated salt water (30,000–50,000 ppm) or with solvents such as alcohols which have at least some degree of miscibility with both water and hydrocarbons. In accordance with the present invention, a suitable treating fluid is a water-in-oil emulsion wherein the aqueous phase has a sufficiently low vapor pressure so as to attract water from the damaged formation, thereby dehydrating and restoring the formation. Suitable oils for use in the emulsion include diesel fuels, kerosenes, light fuel oils, light crude oils, light petroleum fractions, LPG's, and the like. Oil-base and water-in-oil invert emulsion drilling fluids containing vapor pressure depressants are also generally suitable for use as packer fluids, coring fluids, completion fluids, etc.

B. Displacement Fluids

The principles of the invention are also applicable to fluid compositions and methods used in displacing oil from reservoirs. In recent years, for example, it has been observed that water-in-oil emulsions and microemulsions are useful in displacing oil from reservoirs. Such fluids generally are prepared from the same types of oils used to prepare invert emulsion treating fluids. Soluble oils have been employed to form microemulsion displacement fluids. Such formulations are typified by the displacement fluids disclosed in U.S. Pat. No. 3,254,714. The emulsion or microemulsion is injected into a reservoir at one point and driven from that point through the reservoir toward a second point where displaced oil is recovered from the reservoir. Since such emulsions and microemulsions have a substantial degree of miscibility with reservoir oils, and since their viscosities can be controlled to a considerable degree, they appear attractive for use as oil-displacing media. If such fluids, however, are employed in formations which are shaley or have shale streaks, there is a tendency for the shales to interfere with the effectiveness and stability of the emulsions. This tendency can be reduced through application of the present invention by controlling the vapor pressure of the aqueous phase of the emulsions or microemulsions so that it is substantially equal to or less than the aqueous vapor pressure of the shaley constituents of the formation. The manner of control is the same as that described for drilling fluids earlier in this disclosure. Since the vapor pressure of droplets of a liquid become significantly higher than the vapor pressure of the bulk liquid itself if the droplets are small enough, droplet diameter can be a design consideration in formulating microemulsion displacement fluids. Data on the effect of droplet diameter is presented by Paul Becher on page 8 of *Emulsions: Theory and Practice*, Reinhold Publishing Corporation, New York (1957).

C. Fracturing Fluids

Many of the hydraulic fracturing fluids used to stimulate oil wells contain water. When such fracturing fluids are used in the presence of argillaceous, water-sensitive formations, the formations tend to swell and are thereby damaged. This damage can be prevented by using oil-base or water-in-oil invert emulsion fracturing fluids prepared in accordance with this invention. For fracturing fluids the amount of vapor pressure depressant added to the aqueous phase of the emulsion fluid should be sufficient to reduce the aqueous vapor pressure of the emulsion fluid to a level substantially equal to that of the water-sensitive formation. A particularly successful fracturing method which is described in U.S. Pat. No. 3,378,074 utilizes a viscous dispersion of water-in-oil as a fracturing fluid. The viscous fluid is lubricated down the borehole by means of an annular ring of water. Since the fracturing fluid and the annular ring are subjected to extreme turbulence as the combined stream is forced through perforations and into the formation to be fractured, it appears that at least temporarily both combine to form a water-in-oil emulsion. As a result, it is desirable to add a vapor pressure depressant to both the internal phase of the fracturing fluid and the water used to form the annular ring.

III. General

It will be understood, and particularly so with respect to the claims which follow, that while numerous references are made herein to the aqueous activity, relative humidity or relative vapor pressure of materials, e.g., earth formations, samples of such formations and water-containing fluids, in each case the quantitative value referred to is the ratio of the aqueous vapor pressure of the material to the vapor pressure of water at the same temperature. This ratio is proportional to the aqueous vapor pressure of the material, can be measured rapidly and accurately and has proved to be a convenient quantitative value for characterizing the aqueous vapor pressures of material employed or acted upon in association with the methods of the invention. Along these same lines, it will also be understood that the aqueous vapor pressure relationships between well fluids and earth formations referred to herein refer to the aqueous vapor pressures of materials as they exist at downhole temperatures. Also, when the aqueous vapor pressure of an earth formation is mentioned it is assumed that the earth formation is at its natural state of hydration. A particular advantage in characterizing the aqueous vapor pressure of a material by its relative aqueous vapor pressure is the relative insensitivity of the ratio to temperature when compared to the absolute aqueous vapor pressure. This is particularly advantageous where measurements are carried out on well fluids and formation samples in the laboratory or in the field at ambient conditions for the purpose of designing emulsion fluids for downhole conditions. That measurements of relative aqueous vapor pressure conducted at atmospheric conditions of temperature and pressure are very good approximations of downhole conditions has been demonstrated repeatedly by the excellent results achieved when using fluids designed by these techniques in actual well drilling operations.

What is claimed is:

1. A method of drilling a well in a water-sensitive, argillaceous formation with a water-in-oil emulsion drilling fluid which comprises monitoring the aqueous vapor pressure of said drilling fluid during the drilling operation and maintaining an aqueous vapor pressure depressant in the aqueous phase of said drilling fluid in a concentration sufficient to substantially prevent migration of water from said fluid to said formation.

2. A method as defined in claim 1 in which the aqueous vapor pressure of the drilling fluid is monitored by measuring the relative humidity of the atmosphere in contact with a sample of the drilling fluid.

3. A method as defined in claim 1 in which said water-sensitive formation is an argillaceous hard shale formation.

4. A method as defined in claim 1 in which a sufficient concentration of said aqueous vapor pressure depressant is maintained in the aqueous phase of said drilling fluid to render the aqueous vapor pressure of the drilling fluid about equal to the aqueous vapor pressure of said water-sensitive formation, 5. A method as defined in claim 4 in which said water-sensitive formation is an argillaceous hard shale formation.

6. In a well operation in which a water-sensitive, argillaceous shale formation having a natural state of hydration is contacted with a water-in-oil emulsion fluid, the improvement which comprises maintaining the aqueous vapor pressure of said emulsion fluid at a value which will prevent a sample of said formation at said natural state of hydration from absorbing water from said emulsion fluid.

7. A method as defined in claim 6 in which the earth formation is a hard shale.

8. A method as defined in claim 6 in which the aqueous vapor pressure of said emulsion fluid is maintained at a value which will prevent migration of water between said sample and said emulsion fluid.

9. A method of drilling a well through a subterranean, water-sensitive, argillaceous formation comprising determining the aqueous vapor pressure of a sample of said formation having substantially the same state of hydration as the natural hydration of said formation and drilling said formation with a water-in-oil emulsion drilling fluid having an aqueous vapor pressure substantially no greater than the aqueous vapor pressure of said sample.

10. A method as defined in claim 9 in which the aqueous vapor pressure of said sample is determined by measuring the relative humidity of the atmosphere in contact with the sample.

11. A method as defined in claim 10 in which said atmosphere in contact with said sample is in substantial equilibrium with said sample.

12. In a method of drilling a well in a water-sensitive, argillaceous formation with a water-in-oil emulsion drilling fluid containing an aqueous vapor pressure depressant within the aqueous phase, the improvement which comprises measuring the degrees of attraction possessed by one or more samples of said formation for water in said emulsion fluid upon contact therewith and at different sample water contents, determining the concentration of aqueous vapor pressure depressant within said aqueous phase required to substantially prevent migration of water from said aqueous phase to a sample of said formation for a water content substantially equal to that of said formation, and drilling said formation with said emulsion fluid containing said required concentration of vapor pressure depressant in the aqueous phase thereof.

13. In a method of drilling a well in a water-sensitive, argillaceous shale formation with a water-in-oil emulsion drilling fluid wherein the aqueous vapor pressure of said drilling fluid is greater than the aqueous vapor pressure of said formation during drilling, the improvement which comprises adding a water soluble, aqueous vapor pressure depressant to said drilling fluid in a quantity sufficient to lower the aqueous vapor pressure of said drilling fluid to a value substantially equal to the aqueous vapor pressure of said formation.

14. A method as defined in claim 13 in which said water-sensitive formation is an argillaceous hard shale formation.

15. In a method of drilling a well in a water-sensitive, argillaceous shale formation with a water-in-oil emulsion drilling fluid wherein the aqueous vapor pressure of said drilling fluid during drilling is less than the aqueous vapor pressure of said formation, the improvement which comprises increasing the aqueous vapor pressure of said drilling fluid to a value substantially equal to the aqueous vapor pressure of said formation.

16. A method as defined in claim 15 in which the aqueous vapor pressure of the drilling fluid is increased by adding water to the aqueous phase of said drilling fluid.

17. In a method of drilling a well in a water-sensitive, argillaceous shale formation with a water-in-oil emulsion drilling fluid, the improvement which comprises maintaining an aqueous vapor pressure depressant in the water phase of the drilling fluid in a concentration sufficient to prevent the absorption of water by said water-sensitive formation from said drilling fluid.

18. A method as defined in claim 17 in which said water-sensitive shale formation is a hard, argillaceous shale formation.

19. In a method of drilling a well through a water-sensitive, argillaceous shale formation with a water-in-oil emulsion drilling fluid, the improvement which comprises maintaining the aqueous vapor pressure of said emulsion fluid at a value which will prevent the migration of water from said emulsion fluid to said formation.

20. A method as defined in claim 19 in which said formation is a hard shale.

21. A method as defined by claim 19 in which the aqueous vapor pressure of said emulsion fluid is maintained at a value which will prevent migration of water between said emulsion fluid and said formation.

22. A method as defined in claim 21 in which said formation is a hard shale.

23. In a method of drilling a well in a hard, argillaceous shale formation with a water-in-oil emulsion drilling fluid containing an aqueous vapor pressure depressant in the aqueous phase thereof, the improvement which comprises maintaining the aqueous vapor pressure of the drilling fluid at a level that is substantially no greater than the aqueous vapor pressure of said hard argillaceous shale formation.

24. In a method of circulating a water-in-oil emulsion fluid within a well in a water-sensitive, argillaceous shale formation having an aqueous activity less than 0.75, the improvement which comprises maintaining an aqueous vapor pressure depressant in the water phase of said fluid in a concentration such that the aqueous activity of said fluid is substantially equal to the aqueous activity of said formation.

25. A method as defined by claim 24 wherein the aqueous vapor pressure depressant is calcium chloride and the aqueous activity of said formation is not substantially lower than 0.3.

26. In a method of drilling a well through a hard, argillaceous shale formation having an aqueous activity less than 0.75, the improvement which comprises circulating a water-in-oil emulsion drilling fluid within said well, said drilling fluid having an aqueous activity about equal to that of said formation.

27. A method as defined in claim 26 wherein the aqueous activity of said shale formation is not substantially lower than 0.3 and the aqueous phase of said drilling fluid is an aqueous solution of calcium chloride.

28. In a method of drilling a well through a water-sensitive shale formation with a water-in-oil emulsion drilling fluid, the improvement which comprises determining the type and concentration of an aqueous vapor pressure depressant required in the aqueous phase of said emulsion fluid to prevent said formation from withdrawing water from said emulsion fluid and maintaining the concentration of said aqueous vapor pressure depressant in the aqueous phase of said emulsion fluid at a level substantially no lower than said required concentration.

29. The method of claim 28 wherein said aqueous vapor pressure depressant is a water-soluble salt.

30. The method of claim 29 wherein said aqueous vapor pressure depressant is sodium chloride.

31. The method of claim 29 wherein said aqueous vapor pressure depressant is calcium chloride.

32. In a method of drilling a well through a water-sensitive shale formation with a water-in-oil emulsion drilling fluid, the improvement which comprises determining the type and concentration of an aqueous vapor pressure depressant required in the aqueous phase of said emulsion fluid to prevent migration of water between said emulsion fluid and said formation and maintaining the concentration of said aqueous vapor pressure depressant in the aqueous phase of said emulsion fluid at a level substantially no lower than said required concentration.

33. The method of claim 32 wherein said aqueous vapor pressure depressant is a water-soluble salt.

34. The method of claim 33 wherein said aqueous vapor pressure depressant is sodium chloride.

35. The method of claim 33 wherein said aqueous vapor pressure depressant is calcium chloride.

* * * * *